(12) United States Patent
Vakayil et al.

(10) Patent No.: US 9,150,440 B2
(45) Date of Patent: Oct. 6, 2015

(54) METHOD FOR PURIFICATION OF SPENT SULFURIC ACID FROM TITANIUM DIOXIDE RUTILE INDUSTRY

(75) Inventors: Ahmed Yasir Vakayil, Jeddah (SA); Rene Jongen, Jeddah (SA); Ahmad I. Jomha, Jeddah (SA)

(73) Assignee: The National Titanium Dioxide Co. Ltd. (CRISTAL), Jeddah (SA)

( * ) Notice: Subject to any disclaimer, the term of this patent is extended or adjusted under 35 U.S.C. 154(b) by 488 days.

(21) Appl. No.: 13/468,427

(22) Filed: May 10, 2012

(65) Prior Publication Data

US 2013/0302240 A1 Nov. 14, 2013

(51) Int. Cl.
*C01B 17/90* (2006.01)
*C02F 1/52* (2006.01)
*C01B 25/37* (2006.01)
*C01G 23/053* (2006.01)
*C02F 101/20* (2006.01)

(52) U.S. Cl.
CPC .............. *C02F 1/52* (2013.01); *C01B 17/901* (2013.01); *C01B 25/372* (2013.01); *C01B 25/375* (2013.01); *C01G 23/0532* (2013.01); *C02F 1/5236* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 2,038,078 A | 4/1936 | Hardiek | |
| 2,505,344 A | 4/1950 | Tanner, Jr. | |
| 2,864,670 A * | 12/1958 | Walwark, III | 423/530 |
| 3,210,156 A | 10/1965 | Zirngibl | |
| 4,731,089 A * | 3/1988 | Covington | 8/94.29 |
| 5,394,706 A | 3/1995 | Keus | |
| 5,527,985 A | 6/1996 | Funken et al. | |
| 6,530,987 B1 * | 3/2003 | Auer et al. | 106/456 |
| 7,537,749 B2 | 5/2009 | Auer et al. | |

FOREIGN PATENT DOCUMENTS

| | | |
|---|---|---|
| EP | 0132820 A2 | 2/1985 |
| JP | 51009097 A | 1/1976 |
| WO | 98/43716 | 10/1998 |

OTHER PUBLICATIONS non-final Office Action dated Feb. 12, 2015, with attachments, for related U.S. Appl. No. 14/592,162.

* cited by examiner

*Primary Examiner* — Melvin C Mayes
*Assistant Examiner* — Colin W Slifka
(74) *Attorney, Agent, or Firm* — Kilyk & Bowersox, P.L.L.C.

(57) ABSTRACT

A method for the purification of spent sulfuric acid and particularly the purification of spent acid, from titanium dioxide rutile manufacture through a chloride route, is provided. In the chloride route of titanium dioxide manufacture, sulfuric acid is used to clean the un-reacted gaseous flow coming out of the oxidizer, so the spent acid mainly contains un-reacted $Ti^{4+}$ ions, trace amounts of $Fe^{3+}$ ions, and $NO_2$ gas. Titanium phosphate can be precipitated using acidic and or alkaline phosphate-containing precipitants in stoichiometric amounts. The method can include the addition of cutting water to commence the precipitation in two or more steps, when an acidic precipitant is used, and in one step with half the volume of water when an alkaline precipitant is used.

18 Claims, 2 Drawing Sheets

METHOD FOR PURIFICATION OF SPENT SULFURIC ACID FROM TITANIUM DIOXIDE RUTILE INDUSTRY

FIELD

The present teachings relate to the purification of acid waste from a titanium dioxide production process.

BACKGROUND

Sulfuric acid is one of the most widely used chemicals in industrial chemistry. Though not often evident in the final product, sulfuric acid plays a significant role in the production of many chemical products. Most sulfuric acid is discharged from industrial production either as a waste sulfate or in the form of sulfuric acid. Either waste can be discharged in varying degrees of dilution and contamination. The treatment and disposal of spent sulfuric acid from industrial waste streams has long been a problem in many industries.

Sulfate route titanium dioxide industries use concentrated sulfuric acid to digest ilmenite ore, and after precipitation of titanium dioxide, the spent acid needs to be removed. The recycling or disposal of the acid is one of the most difficult hurdles facing the industry. In chloride route titanium dioxide manufacture, sulfuric acid is used to clean the outlet gas from the oxidizer, contains un-reacted titanium chlorides and trace amounts of iron chlorides. This acid is replaced by fresh acid once the specific gravity exceeds a particular limit.

Neutralization is the most popular method for treating waste sulfuric acid solutions. To neutralize sulfuric acid, a variety of bases are added to a sulfuric acid wastewater stream until the stream has been neutralized. A considerable drawback to the total neutralization process is the huge quantity of solid waste generated, which generally requires landfill disposal. Increasingly, higher disposal costs, numerous environmental issues connected with traditional neutralization and landfill practices, and the diminishing amount of landfill space, have led to the need to develop alternative methods to re-use sulfuric acid rather than neutralize it.

Although various alternative methods are available for sulfuric acid treatment and disposal, most of them are very specific, highly dependent on particular impurities present, and dependent on the degree of acid dilution. For example, reverse osmosis has been used to treat or dispose of sulfuric acid. Reverse osmosis forces waste sulfuric acid through costly filtration systems until the acid content of the stream is reduced to a level where the remaining stream can be disposed of by conventional means. This process requires an expensive filtration system that is generally difficult to build and maintain. Moreover, current reverse osmosis filtration systems are only effective for treating small volume streams.

Evaporation is another disposal and treatment method for waste sulfuric acid. Dissipating or removing water from an aqueous sulfuric acid solution, however, requires significant energy input and therefore carries a high cost. The removal of impurities before evaporation presents a further complication. Incineration may also be used to dispose of waste sulfuric acid, but like evaporation, incineration may lead to the creation of acid rain, rendering the process environmentally unacceptable.

U.S. Pat. No. 5,527,985 describes a process for recycling waste sulfuric acid by photo-decomposition of waste acid that is contaminated by organic compounds.

High temperature recycling of highly contaminated waste sulfuric acid by decomposition in water, $SO_2$, and oxygen is described in Winnacker, Kichler; Chemische Technologie; Vol. 2; Page 1; 4th edition. This type of recycling is also performed when the acid is contaminated with organic compounds.

EP 132820 B1 describes the possibility of evaporating dilute acid, optionally extracting metal sulfates, and reacting the remaining metal sulfates with CaO, $Ca(OH)_2$ and/or $CaCO_3$ to form gypsum and sparingly soluble metal compounds. This method, however, is not very economical, in particular because of the energy needed to concentrate the dilute acid. The processing of other spent sulfuric acids that contain heavy metals is generally also costly and uneconomical.

WO 1998/043716 A2 describes an aqueous sulfuric acid purification process that uses freeze concentration involving cooling the aqueous sulfuric acid solution to a temperature at or near its freezing point and separating the resulting acid-rich region from the acid-poor region. U.S. Pat. No. 5,394,706 also describes a freeze concentration method. The acid rich-region is separated from acid-poor region either by centrifuging or by using a density separation column. This method, however, fails when impurities are dissolved uniformly because the impurities are also frozen along with the acid. Moreover, this method cannot purify the acid to minute levels of impurities. The energy efficiency of this method is also of concern.

U.S. Pat. No. 7,537,749 B2 describes a method for processing heavy metal-laden spent sulfuric acid. Iron-laden spent sulfuric acid or iron-laden sulfuric materials are reacted with a material that contains iron chloride and optionally other metal chlorides, producing iron (II) sulfate. The spent sulfuric acid can come from a sulfate route titanium dioxide production.

Both reuse and disposal of spent sulfuric acid has become a nuisance for industries that use acid either as a reactant or as an auxiliary chemical. In most cases, the regeneration of spent sulfuric acid is more expensive than the production of fresh acid from raw materials. Given the limitations in current disposal methods, there exists a need for a cost effective and environmentally prudent method to treat and/or dispose of waste sulfuric acid, particularly sulfuric acid waste resulting from the chloride route for manufacturing titanium dioxide.

SUMMARY

The present teachings relate to spent sulfuric acid purification methods that use one or more precipitants. $Ti^{4+}$ ions can be precipitated as phosphates either by using acidic and/or alkaline precipitants. Dissolved metals can be precipitated after adding water to reduce the concentration of the waste acid. The addition of water, called cutting water, can be performed, for example, in two steps in the case of using an acidic precipitant, or in a single step, with half of the volume of water, in the case of using an alkaline precipitant. The sulfuric acid can be separated from the precipitated phosphates and the resulting concentration can then be analyzed. The resultant acid is reusable, for example, after being adjusted to a desired concentration. In some embodiments, the present teachings provide a method for purifying or enriching an aqueous sulfuric acid solution through separation of impurities by precipitation followed by settling and/or filtration.

It is an object of the present teachings to provide a method for purifying waste sulfuric acid from the chloride route of titanium dioxide manufacture.

It is another object of the present teachings to provide a method for waste sulfuric acid purification by precipitating impurities as phosphate salts using either acidic or alkaline precipitants.

In accordance with various embodiments of the present teachings, a method of purifying waste sulfuric acid from a titanium dioxide production process is provided. A waste sulfuric acid solution having an initial titanium concentration of from about 5,000 ppm $Ti^{4+}$ ions to about 15,000 ppm $Ti^{4+}$ ions can be contacted with an acidic precipitant to form a first reactant mixture. A first volume of water can be added to the first reactant mixture to form a second reactant mixture. The second reactant mixture can be heated at a temperature of from about 75° C. to about 150° C. to form a first digest mixture. A second volume of water can be added to the first digest mixture to form a third reactant mixture. The third reactant mixture can be heated at a temperature of from about 75° C. to about 150° C. to form a second digest mixture comprising a supernatant and a precipitate. The supernatant and the precipitate can then be separated from one another. The supernatant can be collected and comprises a purified sulfuric acid solution having a $Ti^{4+}$ ion concentration that is less than the initial $Ti^{4+}$ ion concentration.

In accordance with various embodiments of the present teachings, a method of purifying waste sulfuric acid from a titanium dioxide production process is provided wherein a waste sulfuric acid solution having an initial titanium concentration of from about 5,000 ppm to about 15,000 ppm $Ti^{4+}$ ions is contacted with an aqueous alkaline precipitant solution. The reactant mixture formed can comprise a precipitate. The reactant mixture can be heated at a temperature of from about 75° C. to about 150° C. to form a digest mixture comprising a supernatant and a precipitate. The supernatant and the precipitate can then be separated from one another. The supernatant can be collected and comprises a purified sulfuric acid solution having a $Ti^{4+}$ ion concentration that is less than the initial $Ti^{4+}$ ion concentration.

BRIEF DESCRIPTION OF THE DRAWINGS

A better understanding of the features and advantages of the present teachings can be achieved by reference to the accompanying drawings, which are intended to illustrate, not limit, the present teachings.

DETAILED DESCRIPTION

Figure 1:
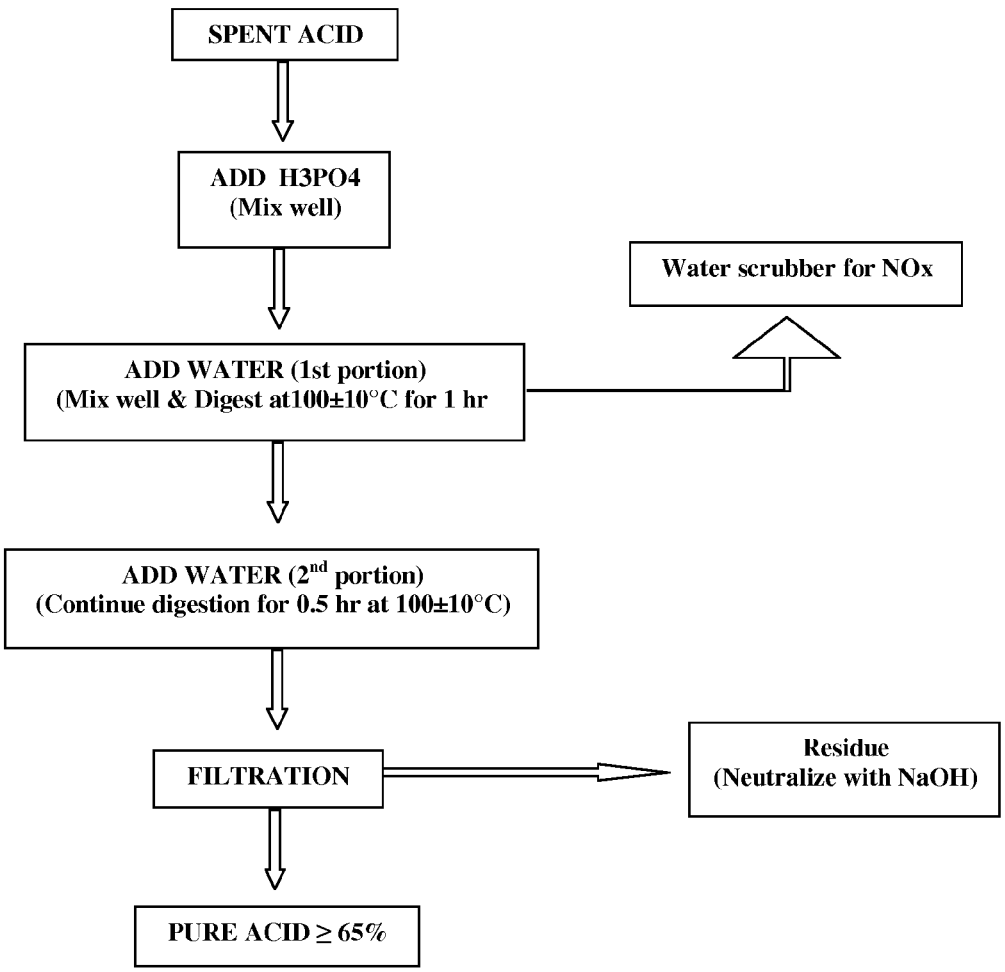
FIG. 1 is a flow chart showing a method of waste sulfuric acid purification by acid precipitation in accordance with various embodiments of the present teachings.

A method of purifying waste sulfuric acid from a titanium dioxide production process is provided in accordance with the present teachings. A waste sulfuric acid solution having an initial titanium ion concentration of up to about 20,000 ppm $Ti^{4+}$ ions, for example, from about 5,000 ppm $Ti^{4+}$ ions to about 15,000 ppm $Ti^{4+}$ ions, can be contacted with an acidic precipitant to form a first reactant mixture. Any suitable acidic precipitant can be used, for example, phosphoric acid or ortho-phosphoric acid. A first volume of water can be added to the first reactant mixture to form a second reactant mixture. The second reactant mixture can be heated to a temperature of from 50° C. to 200° C., for example, at a temperature of from about 75° C. to about 150° C., to form a first digest mixture. A second volume of water can be added to the first digest mixture to form a third reactant mixture. The third reactant mixture can be heated to a temperature of from 50° C. to 200° C., for example, at a temperature of from about 75° C. to about 150° C., to form a second digest mixture comprising a supernatant and a precipitate. The supernatant and the precipitate can be separated from one another, for example, by settling, centrifuge, filtration, or the like. The supernatant can be collected. The supernatant can comprise a purified sulfuric acid solution having a $Ti^{4+}$ ion concentration that is less than the initial titanium ion concentration.

The heating of the second and/or third reactant mixture can comprise heating at a temperature of from about 75° C. to about 150° C., for example, from about 90° C. to about 130° C., or from about 95° C. to about 110° C. The heating of the second and/or third reactant mixture can comprise heating for a period of from about 0.5 hour to about 5.0 hours, for example, from about 1.5 hours to about 2.5 hours, or from about 110 minutes to about 130 minutes. In some embodiments, the contacting causes an exothermic reaction and heating the digest mixture can result from contact with the precipitant such that no heater is needed or used for heating the reactant mixture.

In some embodiments, the waste sulfuric acid solution can have an initial titanium concentration of less than about 5,000 ppm $Ti^{4+}$ ions, from about 5,000 ppm $Ti^{4+}$ ions to about 15,000 ppm $Ti^{4+}$ ions, from about 7,500 ppm $Ti^{4+}$ ions to about 12,500 ppm $Ti^{4+}$ ions, from about 8,000 ppm $Ti^{4+}$ ions to about 10,000 ppm $Ti^{4+}$ ions, from about 8,500 ppm $Ti^{4+}$ ions to about 9,500 ppm $Ti^{4+}$ ions, or greater than about 15,000 ppm $Ti^{4+}$ ions. In some embodiments, the waste sulfuric acid solution can have an initial iron concentration of less than about 50 ppm $Fe^{3+}$ ions, from about 75 ppm $Fe^{3+}$ ions to about 1,000 ppm $Fe^{3+}$ ions, from about 80 ppm $Fe^{3+}$ ions to about 100 ppm $Fe^{3+}$ ions, from about 85 ppm $Fe^{3+}$ ions to about 90 ppm $Fe^{3+}$ ions, or greater than about 1,000 ppm $Fe^{3+}$ ions. The purified sulfuric acid solution can have a final titanium ion concentration of from about 0.0 ppm $Ti^{4+}$ ions to about 1,000 ppm $Ti^{4+}$ ions, from about 5.0 ppm $Ti^{4+}$ ions to about 750 ppm $Ti^{4+}$ ions, from about 25 ppm $Ti^{4+}$ ions to about 500 ppm $Ti^{4+}$ ions, from about 50 ppm $Ti^{4+}$ ions to about 250 ppm $Ti^{4+}$ ions, or higher. The purified sulfuric acid solution can have a final iron concentration of from about 0.0 ppm $Fe^{3+}$ to about 500 ppm $Fe^{3+}$ ions, from about 5.0 ppm $Fe^{3+}$ ions to about 150 ppm $Fe^{3+}$ ions, from about 25 ppm $Fe^{3+}$ ions to about 75 ppm $Fe^{3+}$ ions, or greater than about 500 ppm $Fe^{3+}$ ions.

According to various embodiments, the waste sulfuric acid solution can comprise less than about 55% by weight sulfuric acid, from about 55% by weight sulfuric acid to about 99% by weight sulfuric acid, from about 85% by weight sulfuric acid to about 95% by weight sulfuric acid, or from about 90% by weight sulfuric acid to about 92%, based on the total volume of the waste sulfuric acid solution. In some embodiments, the purified sulfuric acid solution can comprise less than about 55% by weight sulfuric acid, from about 55% by weight sulfuric acid to about 80% by weight sulfuric acid, from about 65% by weight sulfuric acid to about 70% by weight sulfuric acid, from about 68% by weight sulfuric acid to about 70% by weight sulfuric acid, or greater than about 80% by weight sulfuric acid, based on the total volume of the purified sulfuric acid solution.

In some cases, the waste sulfuric acid solution can be contacted with from about 5.0% by weight ortho-phosphoric acid to about 50% by weight ortho-phosphoric acid, from about 10% by weight ortho-phosphoric acid to about 20% by weight ortho-phosphoric acid, or from about 13% by weight ortho-phosphoric acid to about 15% by weight ortho-phosphoric acid, based on the total volume of the waste sulfuric acid solution. A phosphate unit from the ortho-phosphoric acid can be the reactive group, and the percent of the precipitant with respect to spent acid can influence the purity of the resulting purified sulfuric acid. Any suitable phosphoric acid can be used, for example, commercially available ortho-phosphoric acid solution that is available at a concentration of from about 85% by weight ortho-phosphoric acid to about 88% by weight ortho-phosphoric acid, based on the volume of the solution.

In some embodiments, the method comprises contacting the waste sulfuric acid solution with an alkaline precipitant. Any suitable alkaline precipitant can be used, for example, the alkaline precipitant can comprise sodium phosphate or sodium hexa meta-phosphate. The resulting precipitate can be separated from the resulting supernatent by any suitable method, for example, filtration, settling, clarification, centrifugation, or any combination thereof.

The first and second volumes of water to be used can be determined from the volume and/or concentration of the spent acid to be treated. The first and second volumes can each independently comprise from about 5.0% by weight water to about 75% by weight water, from about 20% by weight water to about 60% by weight water, or about 50% by weight water, with respect to the volume of the spent acid, prior to the first digestion. Then, the same volume, a similar volume, a greater volume, or a lesser volume of water can be added prior to the second digestion. The water can be added in two or more stages. Any suitable type of water can be used, for example, tap water, distilled water, deionized water, purified water, or any combination thereof. Precipitant, water, and/or any other reagent can be added at any suitable rate to the spent acid, reaction mixture, or any other intermediate product or composition used or prepared in the methods of the present teachings. In some embodiments, the precipitant, water, or other reagent is added at a rate of less than about 70 g/hr, from about 70 g/hr to about 150 g/hr, from about 100 g/hr to about 125 g/hr, or greater than about 150 g/hr.

According to various embodiments, yet another method of purifying waste sulfuric acid from a titanium dioxide production process is provided. A waste sulfuric acid solution having an initial titanium ion concentration of up to about 20,000 ppm $Ti^{4+}$ ions, for example, from about 5,000 ppm $Ti^{4+}$ ions to about 15,000 ppm $Ti^{4+}$ ions, can be contacted with an aqueous alkaline precipitant solution to form a reactant mixture comprising a precipitate. The initial titanium ion concentration, iron concentration, and sulfuric acid concentration of the waste sulfuric acid to be treated can vary, as described herein in connection with the acid precipitation method. Any suitable alkaline precipitant solution can be used, for example, the aqueous alkaline precipitant solution can comprise an aqueous sodium phosphate solution, for example, a sodium hexa meta-phosphate solution. The aqueous alkaline precipitant solution can comprise, for example, from about 5.0% by weight sodium hexa meta-phosphate to about 50% by weight sodium hexa meta-phosphate, from about 10% by weight sodium hexa meta-phosphate to about 20% by weight sodium hexa meta-phosphate, or from about 14% by weight sodium hexa meta-phosphate to about 16% by weight sodium hexa meta-phosphate, based on the total volume of the waste sulfuric acid solution. The reactant mixture can be heated to a temperature of from 50° C. to 200° C., for example, at a temperature of from about 75° C. to about 150° C., to form a digest mixture comprising a supernatant and a precipitate. Heating temperatures and durations can vary, as described herein in connection with the acid precipitation method. In some embodiments, the contacting causes an exothermic reaction and heating the digest mixture can result from the contact with the alkaline precipitant such that no heater is needed or used for heating the reactant mixture. The supernatant and the precipitate can then be separated from one another. The precipitant can be separated from the precipitate by any suitable method, for example, filtration, settling, clarification, or any combination thereof. The supernatant can be collected, wherein the supernatant comprises a purified sulfuric acid solution having a $Ti^{4+}$ ion concentration that is less than the initial titanium ion concentration. The purified sulfuric acid solution can have a $Ti^{4+}$ ion concentration, an $Fe^{3+}$ concentration, and a sulfuric acid concentration in the ranges described above in connection with the acid precipitation method. Conditions, parameters, techniques, reactants, ranges, and values described for the acid precipitation method, can be used for the alkaline precipitation method, and vice versa.

FIG. 1 is a flow chart showing the steps of a waste sulfuric acid purification process using an acid precipitation method in accordance with various embodiments of the present teachings. Phosphoric acid is added to waste sulfuric acid solution (spent acid) and mixed well to form a reaction mixture. A first portion of water is added to the reaction mixture, mixed well, and allowed to digest for 1 hour at 100° C.+/−10° C. for one hour. A water scrubber is used to process any nitrogen oxides released by the digestion. After the first hour, a second portion of water is added to the reaction mixture and digestion is allowed to continue for another half hour at 100° C.+/−10° C. The reaction mixture is then filtered to separate pure acid at a concentration of greater than or equal to 65% by weight acid, based on the volume of the filtrate. The residue from the filtration is neutralized with sodium hydroxide.

Figure 2:
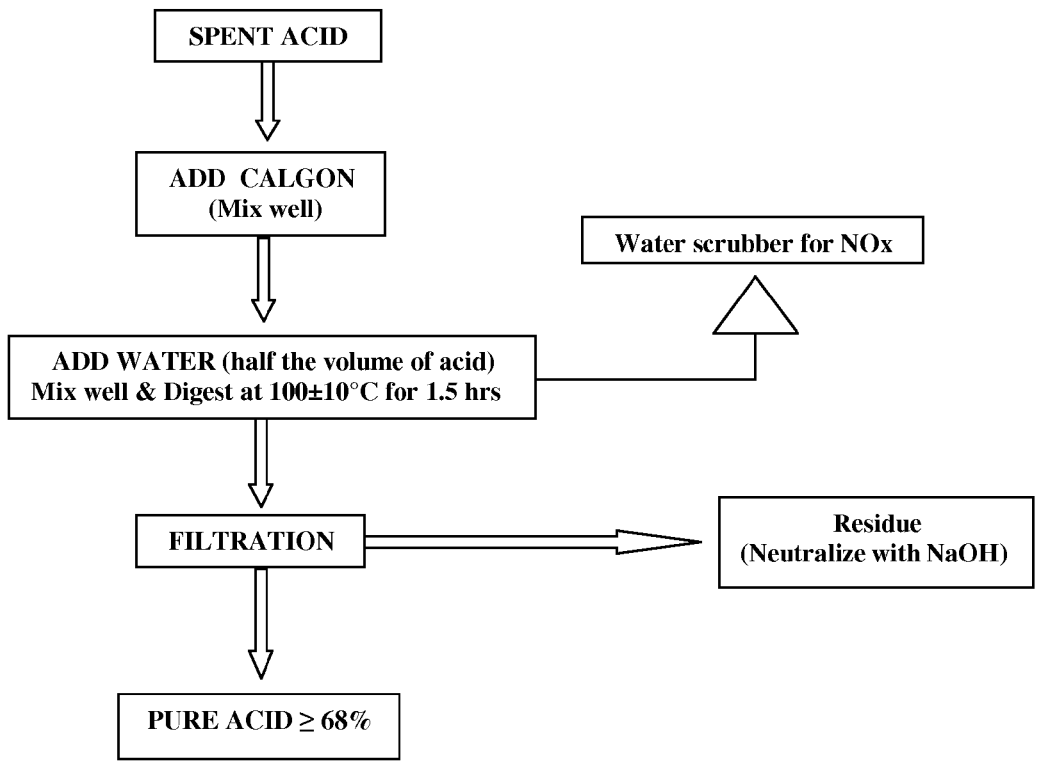
FIG. 2 is a flow chart showing a method of waste sulfuric acid purification by alkaline precipitation in accordance with various embodiments of the present teachings.

FIG. 2 is a flow chart showing the steps of a waste sulfuric acid purification process using an alkaline precipitation method in accordance with various embodiments of the present teachings. Sodium hexa meta-phosphate (Calgon) is added to waste sulfuric acid (spent acid) and mixed well to form a reaction mixture. Water is added at half the volume of acid, mixed well, and allowed to digest at 100° C.+/−10° C. for 1.5 hours. Any nitrogen oxides released by the digestion are processed using a water scrubber. After the digestion, the reaction mixture is filtered and greater than or equal to 68% by weight acid is collected, based on the volume of the filtrate. The residue from the filtration is neutralized with sodium hydroxide.

EXAMPLES

The present teachings can be better understood with reference to the following illustrative, and non-limiting, Examples. The respective properties of the acids after the different purification methods described herein are shown in Table 1 below.

Example 1

50 mL of spent sulfuric acid was added to a 100 mL beaker. 7.5 grams of ortho-phosphoric acid was added to the spent acid in the beaker and the reaction mixture was heated, while being stirred. The temperature was set at 75° C.+/−5.0° C., and the reaction mixture was allowed to digest for 10 minutes at this temperature. Then, the resulting mixture was filtered. The acid concentration and $Ti^{4+}$ ion content in the filtrate was then analyzed. The results are given in Table 1.

Example 2

50 mL of spent sulfuric acid was added to a 100 mL beaker. 7.5 grams of ortho-phosphoric acid was added to the spent acid and the reaction mixture was heated, while being stirred. The temperature was set at 75° C.+/−5.0° C., and the reaction mixture was heated for 30 minutes at this temperature and then filtered. The acid concentration and $Ti^{4+}$ ion content in the filtrate were analyzed. The results are given in Table 1.

Example 3

In Examples 1 and 2, although the acid concentration was high after filtration, the complete removal of titanium ions was not possible and the acid was turbid after filtration due to incomplete precipitation. In Examples 1 and 2, the temperature was too low to enhance precipitation and, therefore, it was raised in succeeding examples.

50 mL of spent sulfuric acid was added to a 100 mL beaker. 7.5 grams of ortho-phosphoric acid was added to the spent acid in the beaker and the reaction mixture was heated, while being stirred. The temperature was set at 100°+/−10.0° C., allowed to digest for 10 minutes at this temperature, and then 50 mL of water was added before gel-like precipitation occurred. Further digestion was carried out for another 5 minutes and the reaction mixture was then filtered. The acid concentration and $Ti^{4+}$ ion content in the filtrate were analyzed. The results are given in Table 1.

Example 4

In Example 3, water was added before the commencement of the precipitation. While this approach reduced the $Ti^{4+}$ ion concentration, the whole system precipitated and the handling was difficult thereafter. Example 3 was repeated with the addition of titanium phosphate nuclei during the digestion and prior to precipitation. The acid concentration and $Ti^{4+}$ ion content in the filtrate were analyzed. The results are given in Table 1.

Example 5

Example 3 was repeated but in the presence of in-situ nuclei by adding $TiOCl_2$ after the ortho-phosphoric acid addition. The acid concentration and $Ti^{4+}$ ion content in the filtrate were analyzed. The results are given in Table 1.

Example 6

In Examples 4 and 5, the precipitation of $Ti^{4+}$ ion was attempted by adding nuclei, and by generating nuclei in-situ, respectively, to precipitate titanium ions. The precipitation, however, was still incomplete. When the (cutting) water was added all at once, the whole system lead to gel-like precipitation and the efficiency of filtration and stirring was affected as a result (Example 3). In Example 6, 50 mL of spent sulfuric acid was added to a 100 mL beaker. 7.5 grams of ortho-phosphoric acid was added to the spent acid in the beaker and the reaction mixture was mixed well. 50 mL of water was then added and the reaction mixture was digested at 100° C.+/−10.0° C. for 1 hour. The precipitate was filtered, and the acid concentration and $Ti^{4+}$ ion content were tested. The results are given in Table 1.

Example 7

In Example 6, water was added and digested for one hour, which improved the $Ti^{4+}$ ion removal, but still there was room for improvement. In Example 7, 50 mL of spent sulfuric acid was added to a 100 mL beaker. 7.5 grams of ortho-phosphoric acid was then added to the spent sulfuric acid in the beaker and the reaction mixture was mixed well. 25 ml of water was then added to the reaction mixture and the resulting mixture was allowed to digest at 100° C.+/−10.0° C. for 1 hour. Another 25 mL of water was then added to the reaction mixture and digestion was continued for another 30 minutes. In other words, tap water was added 50% (w/v) with respect to the spent acid volume, prior to the first digestion, and then the same volume of water was added prior to the second digestion. The precipitate was next filtered, and the acid concentration and $Ti^{4+}$ ion content were tested. The results are given in Table 1.

Example 8

50 mL of spent sulfuric acid was added to a 100 ml beaker. 7.0 grams of sodium hexa meta-phosphate was dissolved in 25 ml of water and was added to the acid and digested at 100°+/−100° C. for 1 hr. The precipitate was filtered and the acid concentration and $Ti^{4+}$ ion content were tested. The results are given in Table 1.

Example 9

In Example 8, the $Ti^{4+}$ precipitation was tried using an alkaline salt sodium hexa meta-phosphate, but the precipitation was incomplete. 50 mL of spent sulfuric acid was next added to a 100 mL beaker. 7.0 grams of sodium hexa meta-phosphate was dissolved in 25 mL of water, which was then added to the acid and digested at 100°+/−10.0° C. for 1.5 hrs. That is, water was added 50% (w/v) with respect to spent acid volume prior to digestion, as 28% (w/v) tap water based on the sodium hexa meta-phosphate dissolved solution. The precipitate was then filtered. The acid concentration and $Ti^{4+}$ ion content were tested. The results are given in Table 1.

TABLE 1

| Example | Acid concentration (%) | $Ti^{4+}$ ions in the filtrate (ppm) | $Fe^{3+}$ ions in the filtrate (ppm) | Nature of Acid after filtration |
| --- | --- | --- | --- | --- |
| 1 | 86.36 | 500 | 58 | Turbid |
| 2 | 87.13 | 450 | 57 | Turbid |
| 3 | 55.41 | 200 | 43 | Slightly turbid |
| 4 | 57.82 | 220 | 42 | Turbid |
| 5 | 55.3 | 250 | 44 | Slightly turbid |
| 6 | 60.2 | 50 | 38 | Slightly turbid |
| 7 | 68.4 | Nil | 22 | Very Clear |
| 8 | 73.47 | 35 | 28 | Slightly turbid |
| 9 | 68.11 | Nil | 20 | Very Clear |

The data shown in TABLE 1 demonstrates that the purification methods of the present teachings provide removal of titanium ions, as well as iron ions, from waste sulfuric acid solutions. It is apparent from the examples that $Ti^{4+}$ ion removal from spent sulfuric acid is possible by either acid-based or alkaline-based precipitation. The results demonstrate that both ortho-phosphoric acid and sodium hexa meta-phosphate can precipitate $Ti^{4+}$ ions as a phosphate salt.

The precipitation was enhanced in the presence of "cutting water," and when cutting water was added in two stages the method particularly enhanced complete precipitation and facilitated filtration. For example, in Example 7, the complete removal of $Ti^{4+}$ ions was achieved using ortho-phosphoric acid and a precipitation that were carried out in two stages. In Example 9, the complete removal of $Ti^{4+}$ ions using an alkaline precipitant was realized by increasing the duration of digestion. In Examples 6-9, surprisingly, the temperature was raised to 100° C.+/−10.0° C. without any additional heating. Instead, the temperature increased due to the exothermic reaction that occurred when the cutting water was added. In examples 6-9, external heating was provided only when needed to maintain the temperature during digestion. In general, however, the temperature was raised to 100° C.+/−10° C. by the exothermic reaction between the water and the acid. External heating was provided only for 30 to 45 minutes in order to maintain the temperature during digestion. In Examples 6-9 the temperature reached 90° C. to 110° C. without any external heating. It was only toward the end of the digestion that external heating was provided to maintain the temperature at 90° C.

Examples 7 and 9 resulted in a very clear acid without any $Ti^{4+}$ ions; while Example 8 gave a slightly turbid acid after filtration. In Examples 8 and 9, sodium hexa meta-phosphate was added as a precipitant. Although the precipitant was basic (alkaline), the acid strength was not reduced significantly, likely because less cutting water was used compared to the experiments that used an acidic precipitant.

It is apparent that variations and modifications to the present teachings are possible without departing from its scope and spirit. It is therefore to be understood that the appended claims are to be construed as encompassing all features of patentable novelty that reside in the present teachings, including all features that would be treated as equivalent thereof by those skilled in the art to which the present teachings pertain. All US, International, and foreign patents and publications, as well as non-patent literature, referred to herein are hereby incorporated herein by reference in their entireties. All publications, patents, and patent applications mentioned in this specification are herein incorporated by reference to the same extent as if each individual publication, patent, or patent application was specifically and individually indicated to be incorporated by reference.

While embodiments of the present teachings have been shown and described herein, it will be apparent to those skilled in the art that such embodiments are provided by way of example only. Numerous variations, changes, and substitutions will now occur to those skilled in the art without departing from the present teachings. It is to be understood that various alternatives to the embodiments of the disclosure described herein may be employed in practicing the present teachings. It is intended that the following claims define the scope of the present teachings and that methods and structures within the scope of these claims and their equivalents be covered thereby.

What is claimed is:

1. A method of purifying waste sulfuric acid from a titanium dioxide production process, the method comprising:
   contacting a waste sulfuric acid solution having an initial titanium ion concentration of up to about 20,000 ppm $Ti^{4+}$ ions with an aqueous alkaline precipitant solution to form a reactant mixture comprising a precipitate;
   heating the reactant mixture at a temperature of from about 75° C. to about 150° C. to form a digest mixture comprising a supernatant and a precipitate;
   separating the supernatant from the precipitate;
   collecting the supernatant, wherein the supernatant comprises a purified sulfuric acid solution having a $Ti^{4+}$ ion concentration that is less than the initial titanium ion concentration.

2. The method of claim 1, wherein the aqueous alkaline precipitant solution comprises an aqueous sodium hexa meta-phosphate solution.

3. The method of claim 1, wherein the initial titanium ion concentration is from about 5,000 ppm $Ti^{4+}$ ions to about 15,000 ppm $Ti^{4+}$ ions.

4. The method of claim 1, wherein the initial titanium ion concentration is from about 8,000 ppm $Ti^{4+}$ ions to about 10,000 ppm $Ti^{4+}$ ions.

5. The method of claim 1, wherein the purified sulfuric acid solution comprises a titanium ion concentration of from about 0.0 ppm $Ti^{4+}$ ions to about 1,000 ppm $Ti^{4+}$ ions.

6. The method of claim 1, wherein the waste sulfuric acid solution comprises from about 85% by weight sulfuric acid to about 95% by weight sulfuric acid based on the total volume of the waste sulfuric acid solution.

7. The method of claim 1, wherein the purified sulfuric acid solution comprises from about 55% by weight sulfuric acid to about 80% by weight sulfuric acid based on the total volume of the purified sulfuric acid solution.

8. The method of claim 1, wherein the heating the reactant mixture comprises heating at a temperature of from about 90° C. to about 130° C.

9. The method of claim 1, wherein the heating the reactant mixture comprises heating for a period of from about 0.5 hour to about 5.0 hours.

10. The method of claim 1, wherein the contacting causes an exothermic reaction and the heating the reactant mixture to form the digest mixture results from the contacting such that no heater is used for heating the reactant mixture.

11. The method of claim 1, wherein the precipitate comprises phosphate salts.

12. The method of claim 1, wherein the supernatant comprises greater than or equal to 68% by weight sulfuric acid.

13. The method of claim 1, further comprising reusing the supernatant collected.

14. The method of claim 1, further comprising reusing the supernatant collected after adjusting the concentration of sulfuric acid in the supernatant collected, to a desired concentration.

15. The method of claim 1, further comprising enriching the supernatant collected by settling.

16. The method of claim 1, further comprising enriching the supernatant collected by filtering.

17. The method of claim 1, further comprising enriching the supernatant collected by settling and filtering.

18. A method of purifying waste sulfuric acid from a titanium dioxide production process, the method comprising:
   contacting a waste sulfuric acid solution having an initial titanium ion concentration of up to about 20,000 ppm $Ti^{4+}$ ions with an aqueous alkaline precipitant solution to form a reactant mixture comprising a precipitate, wherein the aqueous alkaline precipitant solution comprises from about 10% by weight sodium hexa meta-phosphate to about 20% by weight sodium hexa meta-phosphate based on the total volume of the waste sulfuric acid solution;
   heating the reactant mixture at a temperature of from about 75° C. to about 150° C. to form a digest mixture comprising a supernatant and a precipitate;
   separating the supernatant from the precipitate;
   collecting the supernatant, wherein the supernatant comprises a purified sulfuric acid solution having a $Ti^{4+}$ ion concentration that is less than the initial titanium ion concentration.

* * * * *